Figure 1:
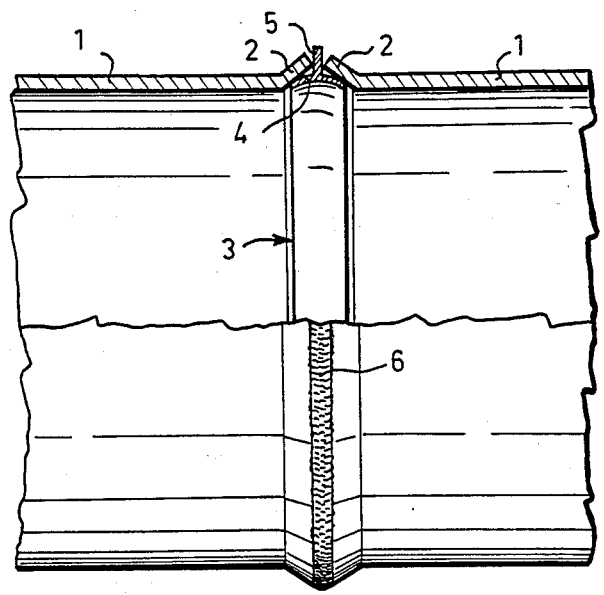

United States Patent [19]

Sundholm

[11] Patent Number: 4,728,126
[45] Date of Patent: Mar. 1, 1988

[54] WELD JOINT

[76] Inventor: Göran Sundholm, Helsingforsv. 23 A, SF-02700 Grankulla, Finland

[21] Appl. No.: 899,390

[22] Filed: Aug. 22, 1986

Related U.S. Application Data

[63] Continuation-in-part of Ser. No. 892,935, Aug. 4, 1986, abandoned.

[51] Int. Cl.$^4$ .............................................. F16L 13/02
[52] U.S. Cl. ...................................... 285/22; 285/286
[58] Field of Search ................. 285/22, 109, 397, 286; 228/250

[56] References Cited

U.S. PATENT DOCUMENTS

| | | | |
|---|---|---|---|
| 1,920,449 | 8/1933 | Unke | 285/22 |
| 1,980,561 | 11/1934 | Wagner | 285/397 X |
| 1,981,850 | 11/1934 | Fisher | 285/22 X |
| 1,987,341 | 1/1935 | Kachel | 285/22 X |
| 2,125,324 | 8/1938 | Williams et al. | 285/397 X |
| 2,232,593 | 2/1941 | Diescher | 285/397 X |
| 2,261,566 | 11/1941 | Russell et al. | 285/397 |
| 2,382,098 | 8/1945 | Robie | 285/22 X |
| 2,646,995 | 7/1953 | Thompson | 285/397 X |
| 2,681,028 | 6/1954 | Phillips | 285/22 X |
| 2,764,426 | 9/1956 | Von Ahrens | 285/22 |
| 3,381,980 | 5/1968 | Smith | 285/109 |
| 3,712,649 | 1/1973 | Martin | 285/397 |
| 4,593,938 | 6/1986 | Denise et al. | 285/22 |

Primary Examiner—Thomas F. Callaghan
Attorney, Agent, or Firm—Ladas & Parry

[57] ABSTRACT

The present invention relates to a weld joint for metal pipes. The object is to provide a weld joint which is easy to make and which has a clean surface inside the pipe. The ends of the pipes to be jointed are flared and a cylindrical metal sealing ring under axial compression is arranged between the inner conical flared surfaces of the flared pipe ends. The edges of the ring are elastically bent inward by the inner conical surfaces of the pipe ends. The sealing ring is preferredly provided with a circumferential flange projecting out between the pipe ends for facilitating correct position of the sealing ring.

6 Claims, 2 Drawing Sheets

WELD JOINT

This application is a continuation-in-part of application Ser. No. 892,935 filed Aug. 4, 1986 and now abandoned.

The present invention relates to a weld joint for metal pipes.

In joining metal pipes by welding the most common practice hereto has been to at first bevel the pipe ends to be joined, which pipe ends before welding from a V with an open bottom towards the inside of the pipe. The welding starts by filling this open bottom, the so-called weld root.

Of the weld root is required a very high quality, which high quality only can be achieved by means of a careful, and expensive, work of a highly qualified welder. Anyway, there remains a serious drawback therein, that slag is formed on the interior surface of the weld root, which slag must be removed afterwards.

It is the object of the present invention to provide a new weld joint which eliminates both above mentioned drawbacks.

The weld joint according to the invention is mainly characterized in that the ends of the pipes to be joined are flared and that an at least essentially cylindrical sealing ring of metal is arranged into abutment with the inner conical surfaces of the flared pipe ends in order to block the weld material as well as other impurities from penetrating into the interior of the pipes, the thickness of the wall of the cylindrical sealing ring being dimensioned such that the edges of the ring wall under the influence of an axial compressive force, transmitted by the flared pipe ends, bend into tight elastical abutment against the inner conical surfaces of the pipe ends, and that the wall of the cyindrical sealing ring is provided with means projecting out between the flared pipe ends, for facilitating the mounting of the sealing ring.

The sealing ring compressed between the internal conical surfaces of the flared pipe ends effectively blocks the bottom V-opening and thereby prevents slag and other impurities from penetrating into the pipe and ensures a weld joint of high quality without the need of a highly skilled (certified) welder even under difficult circumstances.

The importance of obtaining a weld joint which is clean on the inside from the beginning is illustrated by the fact that up to even 60% of all openable (demountable) joints in present hydraulic and lubrication piping systems are provided for the purpose of internal cleaning of the piping systems before they can be taken into operation. The weld joint according to the present invention will make it possible to dramatically reduce the number of expensive demountable joints and thereby to reduce the total costs for material and installation by as much as about 40 to 50 percent.

Further, it is easier to flare the pipe ends than to bevel them in so-called field conditions. Conventional flaring means, e.g. according to SAE-standards (JIC) for a flare angle of 37°, may well be used. Exactness of the flare angle is not crucial, a deviation of e.g. ±3° lacks practical importance.

The weakening (tensions) of the pipe material caused by the cold working is only temporary since the heat of the welding process releases the tensions. On the contrary, due to the fact that the diameter of the weld joint will be enlarged, without corresponding enlargement of the inner diameter, and that the sealing ring forms a stiffening element against outward radial forces, which are decisive with respect to required pipe wall strength (thickness), the weld joint of the invention is capable to withstand much higher bending as well as torsion moments than prior welded pipe joints.

The axial dimension of the sealing ring as well as its wall thickness, in order to have a desired elastical bending of its edges between the inner conical surfaces of the flared pipe ends, is rather easily to be determined by experiments. Another important factor is the correct positioning of the sealing ring, i.e. it should not be inclined (tilted). The earlier mentioned means, e.g. a radial flange, projecting out between the flared pipe ends serves this purpose. A straight flange, or just three pins, will ensure a correct final position of the sealing ring as well as a suitable distance between the flared pipe ends, but it is preferred to provide the radial (circumferential) flange with some kind of corrugations directed to both sides in order to initially guide the sealing ring into correct position and thereby to avoid local excessive deformations of the ring edges. These corrugations are essentially flattened and should not be made too stiff.

In the following the invention will be described with reference to the accompanying drawing.

FIG. 1 shows a preferred embodiment of the invention, partly in a longitudinal section.

FIGS. 2 and 3, 4 and 5, and 6 to 9 show three alternative embodiments of the sealing ring employed in the invention.

In FIG. 1, the pipes to be joined are indicated by the reference numeral 1. The ends 2 of the pipes 1 are flared and between the internal conical surfaces of the flares is arranged an at least essentially cylindrical metallic sealing ring 3 having a wall thickness such that by axial compression of the pipes 1 the edges of the ring wall 4 will be elastically bent into tensioned abutment against the inner conical surfaces of the flared pipe ends 2. Suitable equipment for providing the axial compression force between the pipe ends 2 is readily available on the market and this equipment is therefore considered unnecessary to show in the drawing.

The sealing ring 2 is provided with an outwardly projecting circumferential flange 5 for correct mounting of the ring 3 to avoid excessive deformation of the edges of the ring wall 4 and thereby a loss of the elastical, tensioned abutment between the ring edges and the pipe ends. To achieve this object, a straight circumferential flange 5 could in principle be enough but the sealing ring might initially be tilted either way, whereby either one edge of the ring wall 4 might be at least locally bent too much before both the flared pipe ends hit the flange 5.

This problem is solved by providing the flange 5 with corrugations to both sides, preferably at least three to either side, numerals 10 and 11. The meaning of the word "corrugations" shall here be rather widely understood. The idea is that the flanges 5 shall abut against both pipe ends 2 before applying the axial compression force to the pipes 1, the corrugations being essentially flattened by the axial compression.

Furthermore, the flange 5 gives the advantages of almost completely blocking the bottom V-opening and is capable, at least when pipes of relatively thin wall thickness are concerned, to provide the major part, or all, of the weld material 6, as the flange is melt.

In the welding process, the slag is collected in the cavities between the ring wall 4 and the pipe ends 2 on both sides of the flange 5. The inner part of the flange remains mostly unmelted and forms, together with the ring wall 4, a radially enforcing structure.

Figure 4:
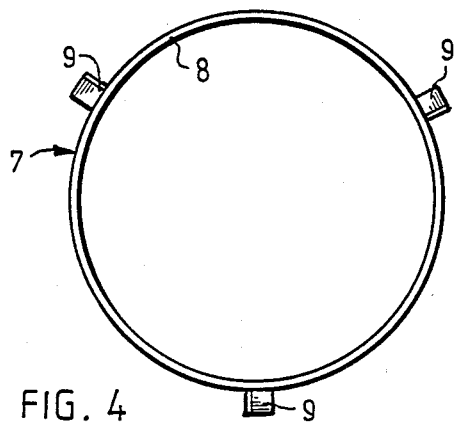
Figure 5:
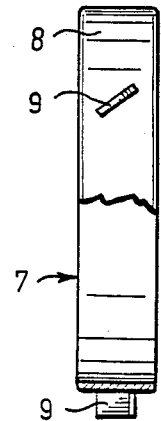
Figure 6:
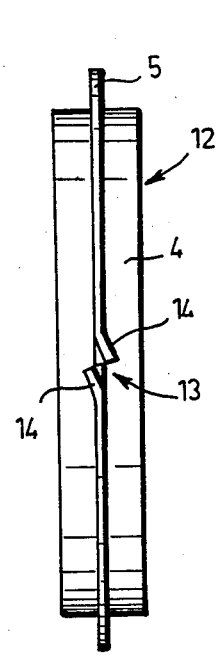
Figure 7:
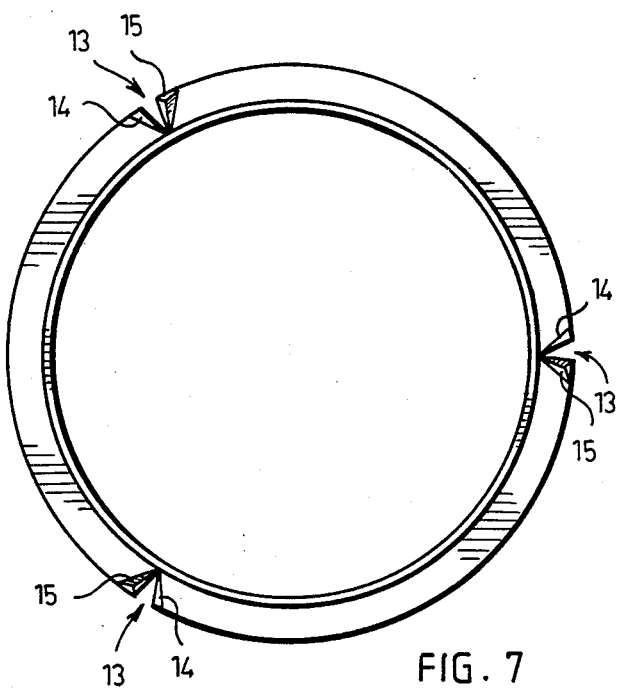

With respect to the just mentioned advantages, the alternative embodiment 7 of the sealing ring, according to FIGS. 4 and 5, is considered a little inferior but it is still capable of centering the ring 7 by means of projecting pins 9 on the wall 8 of the ring, the said pins 9 being preferably at least three in number. The effect of the flange corrugations, described earlier, can be obtained by using pins flattened in an angle, e.g. about 45°, with respect to the peripheral direction of the ring 7. The axial compression force of the pipes 1 turns the inclined pins into alignment with the edges of the pipe ends 2.

Figures 8, 9:
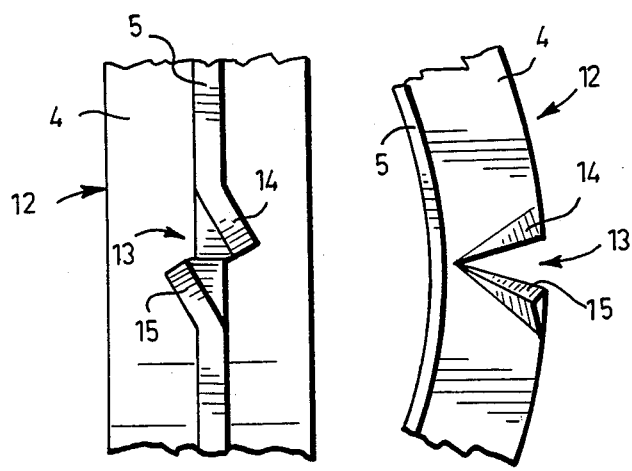

FIGS. 6 to 9 show a third embodiment of the sealing ring, denoted 12 and considered to be the best one. In this embodiment, the "corrugations" of the radial flange 5 are provided by making more or less radial cuts 13 in the flange 5 and by bending the edges 14 and 15 at each cut 13 in opposite directions. (FIGS. 8 and 9 show one cut, in a larger scale). Presses capable of making the cuts 13 and of bending the edges 14 and 15 at the same time are readily available on the market, as well as presses capable of forming the flange 5, with cuts 13 and bent edges 14 and 15, out of a raw short cylinder 4 by cold-working, if large numbers are concerned.

Figure 2:
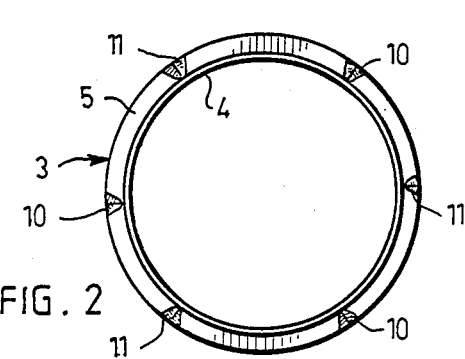
Figure 3:
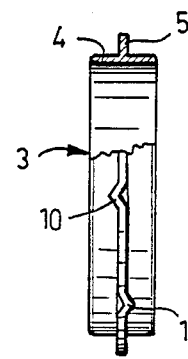

The advantages of the sealing ring 12 are that the number of cuts 13 may be restricted to there and that the cut edges 14 and 15 require less force to be bent back (straightened) than what is necessary for the corrugations 10 and 11 of FIGS. 2 and 3, and for the flattened pins 9 of FIGS. 4 and 5.

All embodiments of the sealing ring 3, 7 and 12 respectively, have a diameter a little larger than the inner diameter of the straight portions of the pipes 1. The sealing effect between the ring 3, 7 or 12 and the flared pipe ends 2 is practically absolute and the sealing effect is further ensured through the influence of a pressure within the tubes 1. Pickling acid or other corrosive liquids temporarily flushed through the pipes 1 are not able to penetrate in between the sealing ring and the flared pipe ends 2, neither of course the medium regularly circulating through the pipes.

I claim:

1. A weld joint for metal pipe comprising:
   first and second metal pipes each having a flared end, each flared end having inner conical surfaces;
   a substantially cylindrical metal sealing ring positioned in abutment with said inner conical surfaces of said first and second pipes, an outer diameter of said ring being dimensioned so that an axial compressive force transmitted by said flared ends of said first and second pipes bends a wall of said ring into tight elastic abutment against said inner conical surfaces of said first and second pipes; and
   yieldable guiding means for guiding said flared ends of said first and second pipes onto said sealing ring, said guiding means comprising a peripheral flange on said sealing ring projecting out between said flared ends and having a plurality of yieldable members produced by cutting said flange and bending said cuts in opposited directions, said flared ends contacting said guiding means before compressing said ring, said members yielding to said axial force to allow said ring to be compressed; whereby said ring is correctly positioned between said flared ends.

2. A weld joint for metal pipe comprising:
   first and second metal pipes each having a flared end, each flared end having inner conical surfaces;
   a substantially cylindrical metal sealing ring positioned in abutment with said inner conical surfaces of said first and second pipes, an outer diameter of said ring being dimensioned so that an axial compressive force transmitted by said flared ends of said first and second pipes bends a wall of said ring into tight elastic abutment against said inner conical surfaces of said first and second pipes; and
   yieldable guiding means for guiding said flared ends of said first and second pipes onto said sealing ring, said guiding means being on the periphery of said sealing ring and projecting out between said flared ends, said flared ends contacting said guiding means before compressing said ring, said guiding means yielding to said axial force to allow said ring to be compressed; whereby said ring is correctly positioned between said flared ends.

3. The weld joint according to claim 2 wherein said guiding means comprises a peripheral flange on said ring, said flange having yieldable corrugations.

4. The weld joint according to claim 3 wherein said flange has three corrugations.

5. The weld joint according to claim 2 wherein said guiding means comprises a plurality of yieldable lugs on said ring, said lugs having a rectangular cross section and being at an angle with respect to the peripheral direction of said sealing ring.

6. The weld joint according to claim 5 wherein said sealing ring includes three yieldable lugs.

* * * * *